Figure 1:
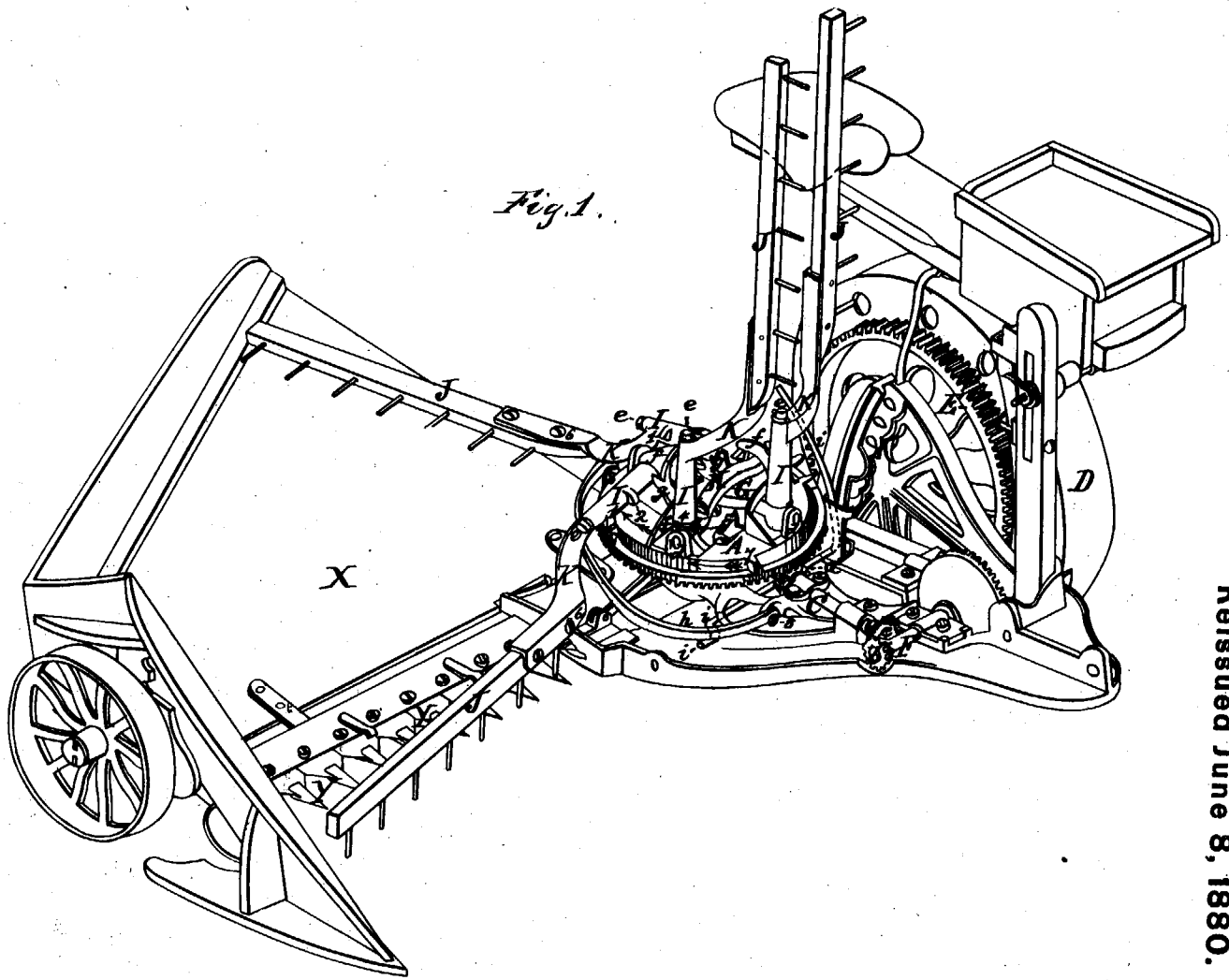

2 Sheets—Sheet 1.

W. A. KIRBY,

Assignor to HIMSELF and D. M. OSBORNE.

Combined Rake and Reel for Harvesters.

No. 9,240. Reissued June 8, 1880.

Witnesses.
W. L. Bennem.
H. H. Isaacs

Inventor
William A. Kirby
by his Atty.
C. S. Kenwick

N. PETERS, PHOTO-LITHOGRAPHER, WASHINGTON, D. C.

W. A. KIRBY,
Assignor to HIMSELF and D. M. OSBORNE.
Combined Rake and Reel for Harvesters.
No. 9,240. Reissued June 8, 1880.
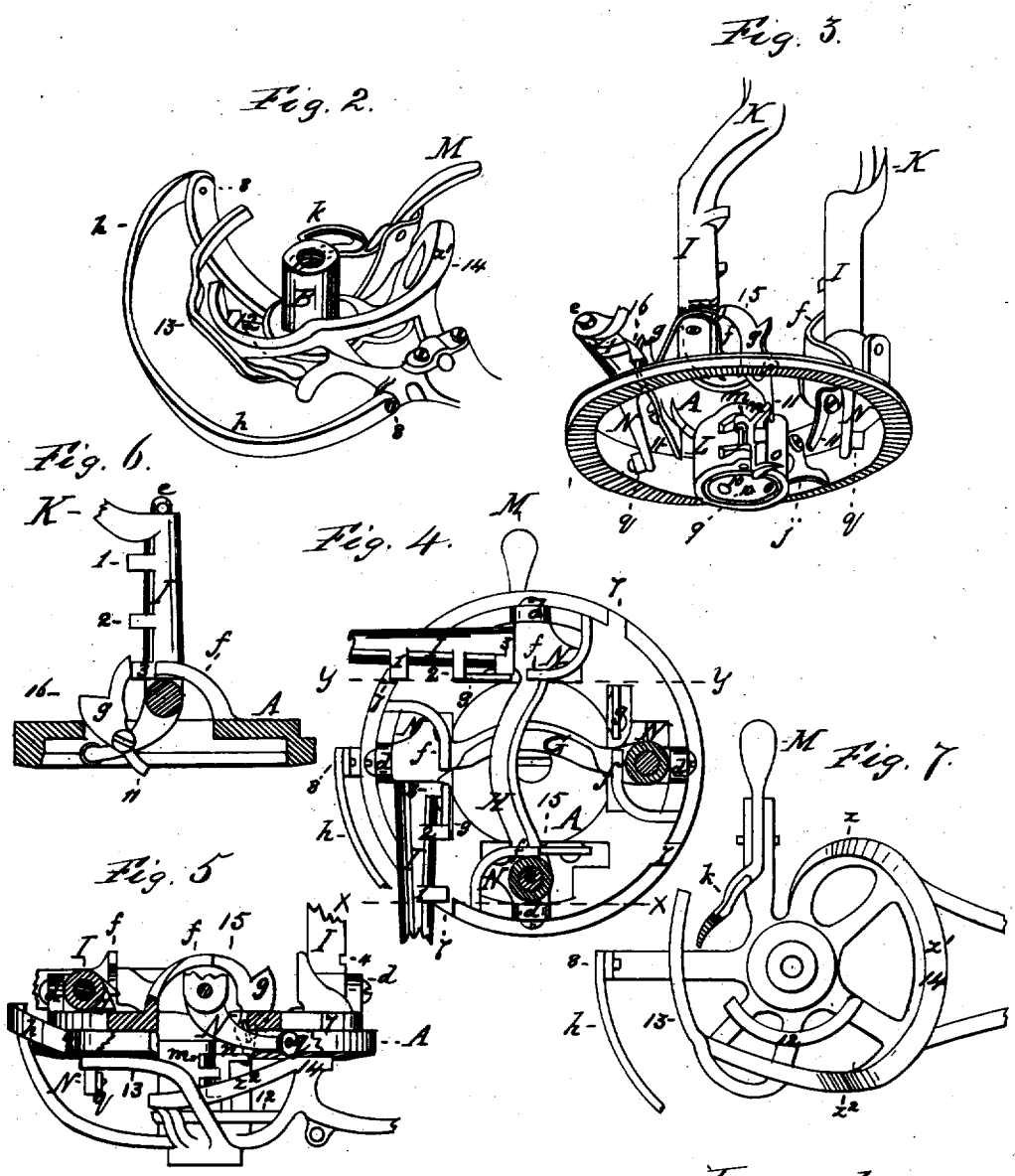
Witnesses
W. L. Bennett
H. H. Isaacs
Inventor.
William A. Kirby
by his Atty
C. S. Renwick
H. PETERS, PHOTO-LITHOGRAPHER, WASHINGTON, D.C.

UNITED STATES PATENT OFFICE.

WILLIAM A. KIRBY, OF AUBURN, NEW YORK, ASSIGNOR TO HIMSELF AND DAVID M. OSBORNE.

COMBINED RAKE AND REEL FOR HARVESTERS.

SPECIFICATION forming part of Reissued Letters Patent No. 9,240, dated June 8, 1880.

Original No. 128,403, dated June 25, 1872. Application for reissue filed July 7, 1879.

*To all whom it may concern:*

Be it known that I, WILLIAM A. KIRBY, of Auburn, in the county of Cayuga and State of New York, invented certain new and useful Improvements in a Combined Rake and Reel for Harvesting-Machines, for which Letters Patent of the United States No. 128,403 were granted to William A. Kirby and David M. Osborne the 25th day of June, 1872; and I do hereby declare the following to be a full, clear, and exact description of the construction and operation of the same, reference being had to the accompanying drawings, making a part of this specification, in which—

Figure 1 represents a perspective view of a harvesting-machine known as the "Kirby," in which my combined rake and reel is shown as applied and operated, but may be applied and used on other machines. Figs. 2 and 3 represent perspective views of detached portions of the rake and reel mechanism, which are not clearly seen in Fig. 1. Fig. 4 represents a plan of the rake and reel mechanism with portions of the reel-arms removed. Figs. 5 and 6 represent upright sections of the same at the lines *x x* and *y y* of Fig. 4; and Fig. 7 represents a plan of the cams of the rake and reel mechanism.

Similar letters of reference, where they occur in the separate figures, denote like parts of the machine in all of the drawings.

My invention consists of certain combinations of mechanical devices, which are stated in detail in the claims at the close of this specification, and which conduce to the production of a combined rake and reel mechanism having a series of revolving and rising-and-falling arms, which can turn or rock upon their journals while revolving, and which can be used as rakes or beaters at the will of the operator, who may ride upon the machine.

To enable others skilled in the art to make and use my invention, I will proceed to describe a machine embodying it in the best form known to me at the date of filing the application for my original patent, first premising that the harvesting-machine, to which the same is represented as being applied in the accompanying drawings, is similar to that heretofore invented and patented by me, and need not be specially described, as it is fully shown in the drawings; nor do I confine my invention of the rake and reel to such a machine exclusively, as it may be applied to other forms or kinds of harvesting-machine quite as well, and I so propose to apply and use it.

In the machine so represented the rake or reel arms are four in number, and each is constructed to operate as a beater only, or as a rake. These arms J are combined with a revolving disk or head, A, whose hub 9 is constructed to turn upon an upright stem or post, B, Fig. 2, and which, when the machine is in operation, is caused to revolve continuously (in the direction of the arrows in Fig. 1) around the upright axis of the said stem by the action of the main carrying and driving wheel D, through the intervention of the ring of beveled cog-teeth upon the under side of said revolving head, the beveled pinion *a* engaging with said teeth the pinion-shaft C, the beveled wheels *b c*, the counter-shaft F, the main pinion of said shaft, and the main cog-wheel E, secured to the main driving-wheel D. The revolution of the said head A carries the rake-arms J with it around its axis, and causes them to revolve over the raking-platform X of the machine in a direction backward from the cutting apparatus Y, and in a forward direction between the stem or post B and the main driving-wheel D.

In order that the said arms may be raised out of a horizontal position when moving forward, and may be permitted to fall to a horizontal position, or thereabout, when moving backward, they are connected pivotally with the revolving head A, this pivotal connection in the present case consisting of the crossed axles G H, fitted to rock in bearings *d d* upon the head, the said axles being bent so that they may pass each other and still rock, although the axes of their journals in the bearings *d d* are hung in the same plane. In order that the arms may also rock axially they are connected with the said axles by means of hubs I, which are fitted to rock upon journals *e e*, projecting laterally from the crossed axles G H. These hubs and arm-journals constitute a second pivotal connection between the arms and the revolving head, and by reason of the two pivotal connections (whose axes are substantially crosswise of each other) the arms, while they revolve with the rake-head A, may be raised and dropped, and may also be rocked. The extent to which each arm may be rocked is determined by a pin and slot, the slot 4 being found in the hub I and the pin 5 passing through the slot into the journal upon which the hub of the arm rocks. In order that each arm in succession may be raised to an upright position, or thereabout, while it is moved forward by the revolution of the revolving head A, a camway is provided to cause the arm to turn upon its first pivotal connection with the said revolving head. This camway 14 is secured beneath the revolving head, and it operates upon each rake-arm through the intervention of a bent arm or rake-shank, N, (one for each rake-arm,) which is secured to the axle (G or H) appropriate to the rake it is to operate, which also extends downward through an opening in the revolving head A, and which is fitted at its end with a friction-wheel, *q*, to run upon the camway 14. As each rake-arm in succession is revolved with the rake-head the friction-wheel of its shank N is brought in contact with the rising grade *z* of the camway 14, and the rake is thereby compelled to tip upward or rise. The rising grade of the camway is succeeded by a grade, *z'*, of uniform height, which, acting upon the rake-shank, prevents the rake from falling until it arrives at the proper position for that purpose, whereupon the friction-wheel of the shank runs down the descending grade $z^2$ of the camway, thus permitting the corresponding rake-arm to fall to the proper position for gathering the grain to be cut to the cutting apparatus Y. A second camway, 13, is provided for the friction-wheel of the shank to pass beneath while the rake-arm is passing in a backward direction over the raking-platform, so as to prevent the rake-arm from tipping upward or rising when acting as a rake.

Although the rake-arms are all alike and can be operated alike, yet either one of them may be caused to operate as a reel-beater only, or as a rake to remove the grain from the raking-platform. When an arm is to operate as a reel-beater only, it is rocked at its hub, (or second pivotal connection,) and its rake-teeth are thereby turned back so as to stand horizontally, or thereabout, and to follow in the wake of the arm while moving over the raking-platform, in which case their teeth are turned back so as not to catch or move the grain on the platform, and are free to yield or roll should any straw or tangled grain catch in the teeth. When, however, the arm is to operate as a rake, it is prevented from turning at its hub while it drops from its raised position, and in this case its rake-teeth project downward into the grain lying on the raking-platform, while the arm is carried over the same by the revolution of the revolving head A, and removes the cut grain from the raking-platform.

In order that the rake-arm may be caused to rock as it drops, for the purpose of acting as a beater only, a stud or projection, 2, is formed upon the rake-hub I, and a dog, *g*, is connected with the revolving head A, so that the head of said dog may be set (as shown at 16, Figs. 3 and 6) in the path of the movement of said stud 2 in its descent with the rake-arm. Consequently the dog *g* then stops the point of the stud and causes the hub in its further descent to rock upon its journal *e*, thereby turning the rake-arm axially.

In order that the rake-arm may be held from turning as it descends, and may thus be caused to act as a rake, the rake-hub I is provided with another stud 3, and the dog *g* is fitted to act in conjunction with a fixed arm, *f*, to form a continuous lateral bearing or guard, which, operating upon said stud 3, holds the rake hub and arm from turning axially or rocking during its descent.

In order that the dog *g* may act as above stated, it is pivoted to the revolving head A, so that its nose may be turned forward, or toward the end of the fixed arm *f*, as shown at 15, Figs. 3, 4, and 5, and may form with it the continuous guard at the side of the rake-hub for the stud 3 to move against; and when the dog is so turned forward its head is out of the range of the rocking stud 2 of the rake-hub, so that the dog then cannot cause the rake-arm to rock. When, on the other hand, the dog *g* is turned backward, so that its head is in a position to act upon the rocking stud 2 and cause the rocking of the rake, the nose of the dog is separated from the arm *f* by a space, through which the stud 3 may then turn, so that no obstruction is then offered to the rocking of the rake-arm.

In order that the rake-arm when it descends as a rake-arm may be supported against the strain while removing the grain from the rocking platform, the revolving head A is fitted with a projection, 7, (one for each rake-arm,) and the rake-hub is provided with a third or supporting stud, 1, which, as the rake descends, engages with the projection 7 of the revolving head, so that the latter sustains the rake by preventing it from rocking at its hub.

From the foregoing description it is evident that any one of the rake-arms may be caused to act as a reel-beater or to act as a rake, according to the position in which the dog *g* of such rake-arm is set; and this position is determined by the action of a hinged lever, M, with which the rake mechanism is combined, and which may be attached to the stationary camway or to the main frame, or any other permanent part of the machine, and may extend into a position where the driver, with his foot or otherwise, may control and operate it, and thereby determine whether such rake-arm is to operate as a rake or as a reel-beater only. The means or combining mechanism through which the controlling-lever M is caused to operate upon the reel-arm in the machine represented in the drawings is as follows: Upon the stem or post B, or rather over it, and over the hub 9 of the wheel or head A, is placed a sleeve or hub, L, Fig. 3, which sleeve L has upon it a hinged bolt, *j*, the point or nose of which projecting through said sleeve will, if not otherwise controlled, pass into one of a series of four holes, 10, in the hub 9, (two only of the holes 10 are seen in the drawings, Fig. 3, but there are four,) one for each of the rakes or beaters, whatever that number may be. So long as the nose of the bolt *j* thus unites the sleeve and hub they will revolve together and with the wheel A. There is upon the sleeve L an upright rocking dog, *m*, having two arms, *n o*, projecting radially from it, one at its upper end and the other at its lower end, the upper, *n*, being in a position to engage with the lower end, 11, of any one of the series of pivoted arms or dogs *g*, (one for each rake-arm or beater,) which the rock-shaft *m* may for the time being correspond with, and the lower arm, *o*, traversing or moving in the range of a camway, 12, which turns the rocking dog *m* and moves the upper arm thereof against the lower end, 11, of the corresponding pivoted dog *g* of the revolving head A, thereby causing said pivoted dog to turn forward, as above described, toward the end of the fixed arm, and form a continuous guard at the side of the rake-hub, the effect of which is to prevent the rocking of the corresponding rake-arm during its descent and to cause it to act as a rake. In order that the rake-arm which is thus caused to operate as a rake may be permitted to act as a reel-beater only, the hinged controlling-lever M is constructed with a forked latch, *k*, which, by the movement of the controlling-lever by the driver, can be placed within the range of movement of the tail-piece *l* of the bolt, so that when the controlling-lever is operated by the driver the said tail-piece in its revolution passes in between the forks of the latch *k*. The lower branch of the latch-fork is inclined, so that when it is within the range of movement of the tail-piece of the bolt *j* the latter is moved up the incline of the lower branch and the bolt-nose is withdrawn from the hub of the revolving head A. So long as the controlling-lever is so held by the driver the fork of its latch is in the way of the further revolution of the tail-piece along with the revolving head A; hence the sleeve L is held stationary, and so long as this stationary condition continues, its rocking dog *m* is prevented from acting upon any of the pivoted dogs *g* of the revolving head A, and all the rake-arms will act as reel-beaters, and no raking will be done. When, however, one of the arms—any one of them—is to act as a rake, the forked latch is dropped by the driver removing his foot or otherwise from the lever, the tail-piece of the sleeve-bolt *j* is released, and the nose of this bolt is left free to engage, and does engage, with the first bolt-hole of the hub of the revolving head that in its revolution comes opposite said bolt-nose, thus connecting the sleeve with the revolving head A, so that when the rocking dog *m* of the sleeve is carried around to its camway 12, and is operated thereby, it moves forward the pivoted dog *g* of a rake-arm corresponding with such bolt-hole, so that the rake-arm operates as a rake; hence the driver, by operating the controlling-lever M, can at his pleasure subject the pivoted dog *g* of any rake, and consequently the rake itself, to the action of the said camway 12, and can let any one of the rake-arms act as a rake, and can throw it out of action again, and can let any other arm act as a rake, as he pleases. So long as the latch of the controlling-lever is down the tail of the bolt *j* will pass it without touching, and consequently no change in the raking and reeling will occur; but when enough straw has not accumulated to make a proper-sized gavel on the platform, then the rake may be thrown out and no raking done, or another arm let in as a rake when enough has accumulated.

The rakes or beater-arms J are connected to their hubs I by a bent metallic shank, K, and are made adjustable on this metallic piece (so that the point of the rake may be raised or lowered) by passing the rear screw, 6, through a slot in the metal shank-piece K. There is also hinged to the frame of the camways, at the points 8, an adjustable or rising-and-falling cam ledge or rail, *h*, which may be raised or lowered by means of a bent lever, *i*, extending up to within convenient reach of the driver or operator. By reason of the positions of those arms which are to act as beaters and the manner in which they turn or rock, their curved shanks when dropping are received upon the hinged camway *h*, and they ride along upon it, and are consequently raised or lowered as it is raised or lowered by the driver through the bent lever *i*. The said beaters may thus be raised up individually or in their series capacity as such while they are in motion, or they may be lowered, as circumstances may require, to move them farther from or nearer to the platform, such raising or lowering being effected at pleasure by the driver either to pass over the grain on the platform or to flatten it down by gently pressing upon it, and in rising or falling the beaters always maintain the same horizontality—a thing they could not do if simply hinged at one end and rising and falling upon the hinged joint that connects them directly with the revolving head; but the arm that acts as a rake (not touching this hinged camway *h*, but dropping beyond it) is not influenced by it as a rake and does not rise. Whenever, however, that same arm again becomes a beater, it is influenced by the rising-and-falling cam ledge or rail *h*, and can be raised or lowered in parallel or horizontal planes at pleasure, while the other arm, which for the time being acts as a rake, takes and moves in its proper path therefor unchanged by the action of the rail *h*.

Having thus described a machine embodying my invention, I claim—

1. The combination, substantially as before set forth, of the rake-arms, the head revolving upon an upright axis and carrying said rake-arms, and the two pivotal connections of each of said rake-arms with said revolving head, whereby a rake-arm while revolving with said head may be permitted to rise and drop, and may also be permitted to rock axially.

2. The combination, substantially as before set forth, of the rake-arms, the head revolving upon an upright axis and carrying said arms, two pivotal connections between each rake-arm and said revolving head, and the controlling-lever which enables the driver to control the action of a rake-arm, so that it may operate as a beater only or as a rake.

3. The combination, substantially as before set forth, of the raking-platform, the head revolving upon an upright axis, a rake-arm carried by said revolving head, and two pivotal connections between such rake-arm and said revolving head.

4. The combination, substantially as before set forth, of the raking-platform, the head revolving upon an upright axis, a rake-arm carried by said revolving head, two pivotal connections between said rake-arm and said head, and the controlling-lever, which enables the driver to determine the action of said rake-arm as a beater only or as a rake.

5. The combination, substantially as before set forth, of the cutting apparatus of the harvester, the head revolving upon an upright axis, a rake-arm carried by said revolving head, and two pivotal connections between said rake-arm and said revolving head.

6. The combination, substantially as before set forth, of the cutting apparatus of the harvester, the head revolving upon an upright axis, a rake-arm carried by said revolving head, two pivotal connections between said rake-arm and said revolving head, and the controlling-lever which enables the driver to determine the action of said rake-arm, so that it may act as a beater only or as a rake.

WILLIAM A. KIRBY.

Witnesses:

O. M. GODDARD,

O. H. BURDICK, Jr.